Feb. 5, 1963
J. M. CHILTON
3,076,515
FEED CONTROL OF BATCH WEIGHING APPARATUS
Filed Oct. 31, 1958
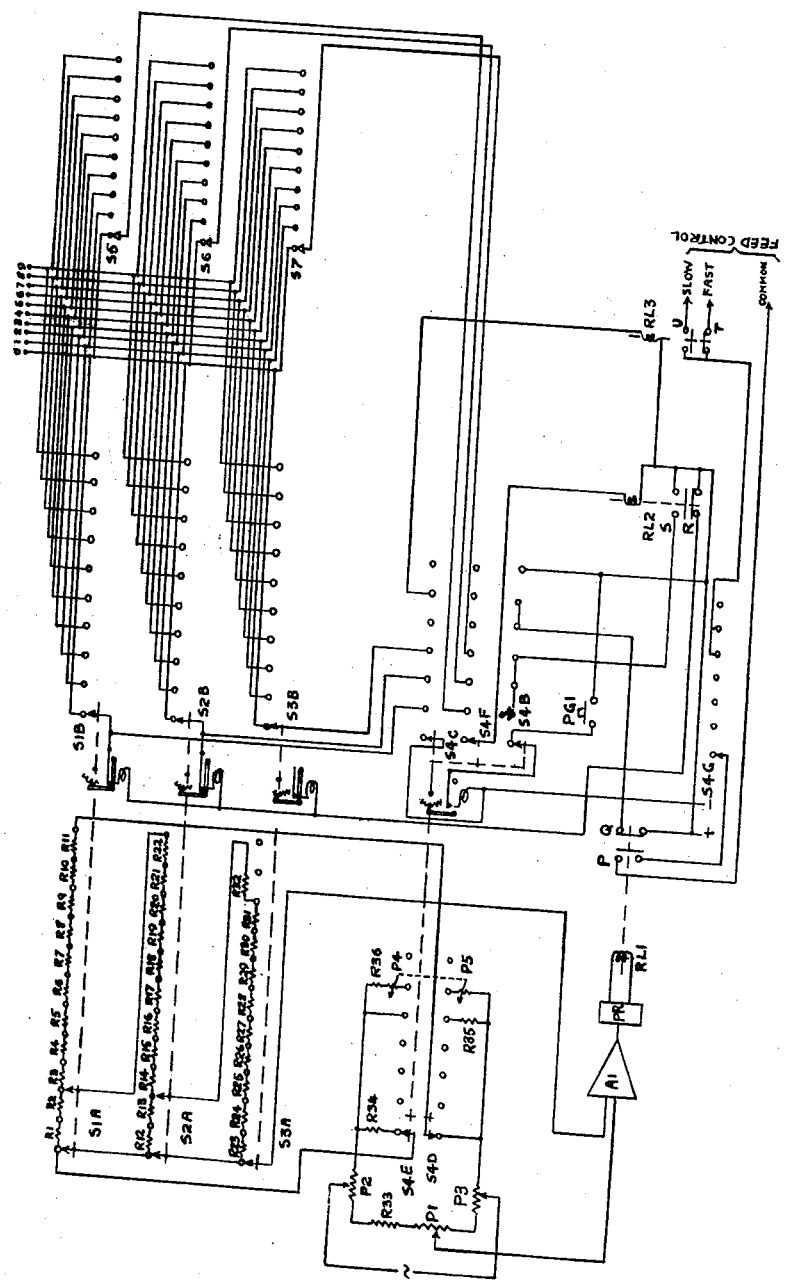
INVENTOR
JOHN M. CHILTON
ATTORNEYS

United States Patent Office 3,076,515
Patented Feb. 5, 1963

3,076,515
FEED CONTROL OF BATCH WEIGHING APPARATUS
John Moorhouse Chilton, Edgbaston, Birmingham, England, assignor to W. & T. Avery Limited, Birmingham, England, a British company
Filed Oct. 31, 1958, Ser. No. 771,004
Claims priority, application Great Britain Nov. 5, 1957
3 Claims. (Cl. 177—81)

This invention has reference to improvements connected with the feed control of batch weighing apparatus.

In my co-pending application Serial No. 697,926, filed November 21, 1957, now Patent No. 3,030,569, there is disclosed and claimed the association with weighing means of a self-balancing potentiometer system for providing a digital representation corresponding to the magnitude of a weighment, comprising variable impedance means controlled by the weighing means, said variable impedance means being incorporated in a bridge circuit embodying a multi-stage potentiometer, a phase-conscious circuit which is responsive to a signal derived from an unbalanced condition of the bridge circuit, contact means controlled by the phase-conscious circuit and thus responsive to a phase reversal of the signal derived from the bridge circuit when the multi-stage potentiometer is adjusted through its bridge balancing setting, and stepping relay means under the control of the said contact means for effecting an automatic setting of the stages of said potentiometer to balance the bridge circuit to accord with the magnitude of the weighment.

The present invention has for its object to provide an adaptation of the aforesaid self-balancing potentiometer system whereby a pre-selected weight of material can be fed into the weigh hopper of the weighing apparatus, the pre-selected weight being determined by manually selected switches, electro-mechanical reading devices operated from punch tape or punch cards, or by telegraphic systems of the type commonly employed in calculating and computing apparatus.

The invention consists of means for controlling the feed of material to a batch weighing apparatus comprising weighing means associated with a self-balancing potentiometer system as hereinbefore specified, a selector mechanism identified with each contact bank of the multi-stage potentiometer and adapted for setting said potentiometer in accordance with the setting of the selector mechanism under the control of the stepping relay means associated with said potentiometer, and means also under the control of the stepping relay means for energizing and de-energizing a control circuit associated with a feed mechanism incorporated in the weighing apparatus to feed a weighment in accordance with the setting of the selector mechanism.

Preferred means for carrying the invention into practice will now be described with reference to the accompanying drawing wherein a circuit is illustrated for the two speed control of the feed mechanism of a batch weighing apparatus.

As seen in the drawing the circuit comprises a multi-stage potentiometer in the form of a Kelvin-Varley potentiometer incorporating three decade stages S1A, S2A and S3A embodying resistances R1—R11, R12—R22 and R23—R32 respectively. As is well known, a Kelvin-Varley potentiometer is a type wherein a vernier voltage divider is moved as a unit along a coarse voltage divider while maintaining a constant net divider resistance for all settings. The terminals of the potentiometer are connected, under the control of the contact banks S4E and S4D of the stepping relay S4 hereinafter described, into a Wheatstone bridge comprising a potentiometer P1 coupled to the indicator spindle of the weighing apparatus, potentiometers P2 and P3 constituting preset controls for ensuring that the two potentiometer outputs balance at the upper and lower limits of the weighing apparatus with the Kelvin-Varley potentiometer set at the corresponding tapping positions, and a resistance R33 for determining, in conjunction with resistances which may be introduced by the banks S4E and S4D, the balancing point of the bridge. The output signal from the Wheatstone bridge is fed to a phase conscious circuit comprising an amplifier stage A1 and an output stage PR which controls a relay RL1 in such manner that a phase reversal of the signal derived from the Wheatstone bridge results in the alternate actuation of the relay RL1 to make or break the alternate contact pairs P and Q associated with this relay.

The moving contacts of the various stages of the Kelvin-Varley potentiometer are respectively controlled by stepping relays S1, S2, and S3, the sequential energization of these stepping relays being controlled by a further stepping relay S4, herein referred to as the governing relay.

The above described circuit generally follows that of the self-balancing potentiometer system disclosed in my above-identified application Serial No. 697,926.

Each of the fixed contacts S1B, S2B and S3B of the three stepping relays S1, S2 and S3 has connection with the respective contacts of three contact banks S5, S6 and S7, herein referred to as the selector contact banks, and the position of the moving contacts of these selector banks may be set in any convenient manner such for example, as by manually operable switches, electromechanical reading devices operated from punched tape or punched cards, or a telegraphic system in the manner commonly employed in calculating and computing machines, by which means the said moving contacts can be set to pre-determine the weight of a batch of material to be fed to the weighing apparatus. Each of the actuating coils for stepping relay S1, S2 and S3 is connected through contacts R of relay RL2 to the positive terminal 14 of the power supply and through wiper arm associated with the B contact bank and contacts 2, 3 and 4 respectively of contact bank S4C and its wiper arm to the negative supply terminal 10.

Selector banks S5, S6 and S7 have a movable contact which is adapted to be set at a preselected weight either manually, by an electro-mechanical reading device operated from punched tape or punched card, or by telegraphic systems of the type commonly employed in calculating and computing apparatus to represent a three digit number, the highest order digit being set in selector bank S5, the next order digit set in selector bank S6, and the lowest order digit being set in selector bank S7. The settable contacts of selector banks S5, S6 and S7 are connected to the fixed contacts 2, 3 and 4 respectively of contact bank S4F of the control stepper switch S4. The wiper arm associated with contact bank S4F is connected through relay coil RL2 and to the positive supply terminal 14.

When the control stepper switch S4 is in its number 2 contact position with the wiper arm S4F connected to the number 2 terminal to place the S5 selector bank into the circuit in series with relay RL2, RL2 becomes energized when stepper switch S1 advances so that wiper arm S1B is on the contact numbered correspondingly, and thus connected with the fixed contact on selector bank S5 on which the settable arm has been placed. When relay RL2 is energized, contacts R open to thereby de-energize the driving coil for stepper switch S1. At the time contacts R open, contacts S close to thereby provide a circuit from positive supply terminal 14 through closed contacts S to the number 2 contact on contact bank S4B and its wiper arm to the driving coil of control stepper switch S4, the other end of which is connected directly to the negative supply terminal 10. At this time, the control stepper switch S4 is energized to advance the wiper arms to their number 3 position and relay RL2 is again de-energized.

The cycle of operation is again repeated, this time with selector bank S6 and stepper switch S2 being in the circuit until stepping relay S2 has advanced to a position determined by the setting of the movable contact on selector bank S6 when relay RL2 is energized and control stepper switch S4 advances to its number 4 contact position. The cycle is then completed for the third time with contact bank S7 and stepper switch S3.

Thus, the number 2, 3 and 4 positions of the control stepper switch S4 are used to permit the stepping relays S1, S2 and S3 to move their corresponding wiper arms S1A, S2A and S3A respectively into a position corresponding to the position of the settable contacts of selector banks S5, S6 and S7 as set by the operator.

In the balancing bridge circuit where the contact banks S4D, and S4E are connected, no circuit connections are provided in the number 2, 3 or 4 positions of the control stepper switch S4 since in these positions of the control stepper switch S4, the bridge circuit need not be energized and no material will be added to the weigh hopper 10.

At position 5 of the control stepper switch S4, the wiper arms on switch contact banks S4D and S4E are connected to a completed circuit through the Kelvin-Varley bridge. Relay RL1 is in an energized condition when the weight in hopper 10 is less than programmed to thereby close contacts P which serve to complete the circuit to fast relay contact T of relay RL3 to open the fast feed valve, and to open contacts Q to thereby prevent voltage from the positive supply terminal 14 from being applied to wiper arm S4B.

The value of resistor R35 connected to the number 5 terminal on switch bank S4D is so chosen as to cause balance to be prematurely indicated whereby RL1 first becomes de-energized and the switch contacts transferred at terminals P and Q. Contacts P are opened and the fast feed valve is then de-energized. Contacts Q close to apply the positive potential to contact 5 of wiper arm S4B to thereby advance the control stepper switch S4 to the number 6 position.

With control switch S4 in the number 6 position, the bridge circuit is again underbalanced by virtue of the addition of resistors R36 and potentiometer P4 in the circuit from terminal 6 associated with stepper switch contact bank S4E and potentiometer P5 connected to terminal S4D whereby underbalance is indicated and relay R1 is again energized and contacts P closed. Contacts Q are thus opened and hence the control stepper switch S4 stays at the number 6 position. The negative power supply voltage is connected through contact S4C at its number 6 position through relay RL3 to thereby open contacts T in the fast feed circuit and close contacts U and cause energization of the slow feed valve.

The number 7 position of control stepper switch S4 contains only a connection in the S4B bank to cause automatic advancement of the control stepper switch S4 to its zero or homing position.

The operation of the circuit is as follows:

With the relays initially set in their positions shown, no material present in the weigh hopper of the weighing apparatus, and the settable contacts of the selector banks S5, S6 and S7 set to pre-determine the total weight of the batch of material to be subsequently fed to the weigh hopper, when the control press-button PB1 is actuated the energizing coil of the governing relay S4 is energized to traverse the moving contacts of each of its banks S4B through S4G to their 2nd contact positions. In the 2nd position the contact engaged by the moving contact arm of the selector bank S5 is energized via the moving contact of the bank S4F and the energizing coil of the relay RL2. Simultaneously the stepping relay S1B is energized via the contact bank S4C and the contact pair R of relay RL2 whereby the moving contact of the stepping relay S1B is traversed across its fixed contacts. When the moving contact of the stepping relay S1B coincides with the energized contact determined by the setting of the selector bank 5, current will flow through the energizing coil of relay RL2 so that the relay RL2 is energized to break the contact pair R and make the contact pair S; thus the stepping relay S1B is de-energized at a setting corresponding with that of the settable contact for selector bank S5, and the governing relay S4 is energized to step its moving contacts to the 3rd position whereupon the relay RL2 is de-energized and re-set with the R contacts closed. In a similar manner the moving contacts of the stepping relays S2B and S3B are set in accordance with the settings of the selector banks S6 and S7 and the moving contacts of the governing relay S4 arrive at their 5th contact positions.

At the 5th contact position of the governing relay S4 a connection is made through the bank S4G and the contact pair T of the relay RL3 to the fast feed connection to the feed mechanism of the weighing apparatus. The feed control mechanism may be any of the conventional forms known in the art such as for example a vibratory feed, conveyor feed or gate controlled gravity feed wherein the cut-off device or devices are adapted for control by the circuit herein described.

Referring to the contact banks S4E and S4D associated with the Wheatstone bridge circuit it will be appreciated that since the potentiometer P1 will usually be set at zero due to the absence of any material in the weigh hopper, and by virtue of the completion of the bridge circuit at the 5th contact position through the direct connection of S4E to the potentiometer P2 and through the resistor R35 of S4D, the difference in the setting of the potentiometer P1 and the pre-set condition of the Kelvin-Varley potentiometer will result in an under-balanced condition of the bridge. The under-balanced condition is arranged to effect the actuation of the relay RL1 to make the contact pair P and thus complete the circuit to the feed control mechanism whereby the feeding operation is initiated, and to break the contact pair Q whereby the 5th contact of the bank S4B is de-energized. The feeding operation continues until the potentiometer P1 arrives at a bridge balancing setting whereupon the output signal from the bridge reverses in phase and the relay RL1 is actuated to break the contact pair P and make the alternate contact pair Q. By this means the 5th contact on S4B is now energized whereby the energizing coil of the governing stepping relay S4 is energized to traverse its moving contacts to their 6th positions. Thus a circuit is established through the 6th contact of bank S4C and the energizing coil of the relay RL3 whereby this relay is actuated to engage the contact pair U and establish a part of the circuit to the slow speed connection of the feed mechanism.

The weight at which the changeover is to occur from the fast to the slow feed condition is determined by the magnitude of the resistances R35 which is arranged to provide a balanced condition of the bridge when the weight of material in the weigh hopper is a predetermined amount less than the total weight to be delivered thereto and the corresponding setting of the Kelvin-Varley potentiometer.

It will be appreciated however that when the 6th contact positions of the banks S4E and S4D of the governing relay are engaged the biasing effect of the resistances R35 is removed so that the bridge is once more underbalanced and the relay RL1 is consequently re-set by the resulting phase reversal to break contact pair Q and make contact pair P whereby the slow feed circuit is completed. The slow feeding operation continues until the bridge is balanced whereupon the contact pair P is broken by the resultant phase reversal of the bridge signal in the phase conscious circuit. When the relay RL1 is re-set to make the contact pair Q the energizing coil of the governing relay S4 will be energized to traverse the moving contacts of the governing relay to their 7th positions, the contacts being then "homed" by the connection of the 7th contact of S4B to the supply.

In accordance with common practice it is usually necessary to effect the final cut-off of the material flow somewhat earlier than the deposit of the required total weight in the weigh hopper in order to compensate for any material which is in suspension above the weigh hopper and any "over-run" which may be present in the system. This effect is achieved in the present system by the connection into the bridge circuit at the 6th contact positions of the contact banks S4E and S4D of a pair of ganged potentiometers P4 and P5 which provide the required degree of biasing of the balancing point of the bridge circuit and hence the final cut-off operation of the relay RL1.

It will be appreciated that in the above described circuit a fully automatic delivery of the required amount of material into the weigh hopper is provided in accordance with the setting of the selector banks S5 to S7 once the press-button control PB1 has been actuated. If it is required to weigh several ingredients in the same batch e.g. for blending or mixing purposes, the selector switches S5 to S7 are re-set after the first weighment to the gross weight of the two ingredients and the second feeding operation is then commenced and completed as above described. The addition of a third and further ingredients may be effected in a similar manner.

It will be appreciated that although a three decade Kelvin-Varley potentiometer has been employed in the described example for providing a decimal representation, by modification of the potentiometer avoirdupois or other weight systems may be accommodated.

I claim:

1. In a batch weighing apparatus having material weighing means; feed means for supplying material to said weighing means; a bridge circuit incorporating in one pair of legs thereof a weight responsive potentiometer having its movable contact controlled by the weight of material in said weighing means; a multi-stage potentiometer system in the other pair of legs of said bridge circuit and having a plurality of resistance stages; and sensing means connected in said bridge circuit to detect a balanced condition of said bridge circuit, said multi-stage potentiometer system comprising a plurality of electro-magnetically operated multi-bank selector switches identified one with each of said potentiometer stages and each providing first and second fixed contact banks, said first contact bank being connected across respective potentiometer resistances in said potentiometer system, a multi-stage control device having its stages respectively connected to the fixed contacts of the second banks on said selector switches to energize a selected fixed contact in each bank according to a digital manifestation of a desired weighment set up on said control device, and a governing selector switch operable to effect, in sequence, the traverse of the moving contacts of said second banks to the selected energized contacts to thereby traverse in sequence the moving contacts associated with the potentiometer fixed contacts and establish a setting of the potentiometer representative of the required weighment, said governing selector switch being further operable under the control of said sensing means to operate the feed means to arrest the feed of material to said weighing means when the weight responsive potentiometer balances the selected setting of the multi-stage potentiometer.

2. Batch weighing apparatus as defined in claim 1 wherein the self-balancing potentiometer system further includes variable resistance means whereby the system is adapted to be balanced at a weighment less than the setting of the multi-stage potentiometer thereby to cut off the feed of material so as to compensate for material in suspension between the feeding means and the weighing means.

3. Batch weighing apparatus according to claim 1 wherein the feeding means is of the type having a fast feed rate and a slow feed rate and wherein the potentiometer system is adapted to be first balanced at a predetermined weight less than that at which cut off is effected thereby to initiate a change of the delivery rate of the feeding means from fast rate to slow rate and to be again balanced to effect the cut off of the feeding means.

References Cited in the file of this patent
UNITED STATES PATENTS

| | | |
|---|---|---|
| 2,098,324 | Ward et al. | Nov. 9, 1937 |
| 2,584,897 | Marco | Feb. 5, 1952 |
| 2,733,911 | Thurston | Feb. 7, 1956 |
| 2,801,819 | Lindars | Aug. 6, 1957 |
| 2,801,874 | Macgeorge | Aug. 6, 1957 |
| 2,868,491 | Thorsson et al. | Jan. 13, 1959 |